United States Patent Office.

JOSEPH WOLFF, OF LEXINGTON, KENTUCKY.

Letters Patent No. 99,615, dated February 8, 1870.

---

IMPROVEMENT IN THE MANUFACTURE OF YEAST FOR DISTILLERS.

---

The Schedule referred to in these Letters Patent and making part of the same.

---

I, JOSEPH WOLFF, of Lexington, in the county of Fayette, and State of Kentucky, have invented a new and useful Improvement in the Manufacture of Yeast for Distillers.

My improved yeast is produced by the following process:

Take one hundred pounds of rye and fifty pounds of malt; heat water to 175° or 180° Fahrenheit, and stir in, first the rye, and afterward the malt. Let it stay covered for one hour; then uncover, and let it remain for thirty-six hours, or until it acquires the wine-acid. Then cool the same down to 70° or 75° Fahrenheit, and put to each one hundred pounds, one and one-half gallons good fresh brewer's yeast. Then take two ounces sal ammoniac and two ounces aloes; dissolve in warm water, (100° Fahrenheit,) and stir well into the above, and let it stay until it heats up 14°. Should the yeast not reach the required acidity, it may be stimulated by exposure to the atmosphere, either by the rake or paddle.

By the above process, yeast may always be produced within forty-eight hours, if necessary, and produce from fourteen to sixteen quarts of whiskey from each bushel of grain; thus complying with the United States statute.

I claim, as my invention—

The process for making distiller's yeast, substantially as herein shown and described.

In testimony of which invention, I hereunto set my hand.

JOSEPH WOLFF.

Witnesses:
GEO. H. KNIGHT,
JAMES H. LAYMAN.